Patented July 6, 1954

2,683,124

UNITED STATES PATENT OFFICE 2,683,124

ION-EXCHANGE RESINS FROM A VINYL HETEROCYCLIC AMINO COMPOUND AND A VINYL-CYCLOHEXENE

Gaetano F. D'Alelio, Pittsburgh, Pa., assignor to Koppers Company, Inc., a corporation of Delaware No Drawing. Application September 24, 1949, Serial No. 117,733

22 Claims. (Cl. 260—2.1)

This invention relates to new anion-exchange resins. More particularly it relates to the preparation of anion-exchange resins from vinyl pyridines and related compounds.

Ion-exchange resins have been found desirable for a wide variety of commercial uses. For example, such resins are being used in the purification, deionization, and softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Anion-exchange resins used for some of these purposes are disclosed in applicant's U. S. Patent 2,366,008, assigned to the General Electric Company, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehyde resins, and the phenol-formaldehyde-diethylene-tri-amine and triethylene-tetramine resins, etc. However, the efficiency of these resins is not sufficiently satisfactory for many anion-exchange purposes.

Anion-exchange resins of great utility have now been found which comprise water-insoluble, infusible resins containing the pyridyl nucleus, such as prepared from vinyl pyridines and vinyl quinolines and their alkyl and alkenyl derivatives by cross-linking with cyclic diene compounds as described more fully hereinafter.

The vinyl pyridines and vinyl quinolines which may be used in the practice of this invention include 2-vinyl-pyridine, 4-vinyl-pyridine, 3-vinyl-pyridine, 2-vinyl-quinoline, 4-vinyl-quinoline, 6-vinyl-quinoline, as well as their alkyl and alkenyl derivatives, e. g., 2-vinyl-4-methyl-pyridine, 2-vinyl-6-methyl-pyridine, 3-vinyl-6-methyl-pyridine, 3-vinyl-4-methyl-pyridine, 2-vinyl-4,6-dimethyl-pyridine, 2-vinyl-5-ethyl-pyridine, etc. In some cases it may be permissible to use an alpha-methyl-vinyl pyridine where one of the more active cross-linking agents is used in a high proportion. The inventor has found that for purposes of this invention the nuclear-substituted alkyl and alkenyl derivatives of vinyl pyridines and vinyl quinolines, as covered by the following formula, are equivalents of the vinyl pyridines and vinyl quinolines:

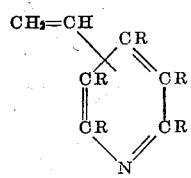

wherein R is hydrogen, alkyl, alkenyl or a divalent hydrocarbon group which forms part of a six-carbon ring by attachment to the R on an adjacent carbon atom of the formula, one of the two carbon atoms which are common to both rings being adjacent to the N of the formula.

These vinyl pyridines and vinyl quinolines are converted to insoluble, infusible polymers by cross-linking of the vinyl pyridine or vinyl quinoline molecules by copolymerization with at least one copolymerizable cyclic diene hydrocarbon in which the unsaturation is either in the ring or in both the ring and a side chain comprising a vinyl or isopropenyl group. Example of cyclic dienes suitable for the purposes of this invention are cyclopentadiene, dicyclopentadiene, cyclohexadiene, vinyl cyclohexenes, e. g., 4-vinyl-cyclohexene (1 - vinyl - cyclohexene - 3), 1 - vinyl - 1-methyl-vinylcyclohexene-3, etc., isopropenyl cyclohexene, e. g., 1-(alpha-methyl-vinyl)-4-methyl-cyclohexene-3, etc.

The invention may be best described by the following examples. These examples serve to illustrate various methods of practicing the invention and are not intended as limitations to the scope of the invention. In these examples and throughout the specification "parts" and "percent" are given in parts and percent by weight.

*Example I*

Cross-linked copolymers of 2-vinyl-pyridines are made in bead form by suspension polymerization in a pressure-tight autoclave by the following procedure. To the autoclave are added:

0.18 part benzoyl peroxide—dissolved in vinyl pyridine
0.05 part tert.-butyl perbenzoate—dissolved in vinyl pyridine
90 parts 2-vinyl-pyridine
10 parts cyclopentadiene
200 parts distilled water
3 parts hydroxy apatite (submicronic particle size)
0.03 part sodium oleate The autoclave is then closed and agitated by a rocking mechanism while the autoclave is immersed in a controlled-temperature bath at 90° C. for about 10 hours and then at 113°–115° C. for about 5 hours. The resultant copolymer beads are washed with dilute hydrochloric acid to remove any suspension agent, then with dilute sodium hydroxide to remove adsorbed hydrochloric acid, then with water, and subsequently dried at 70° C. for about two hours.

*Example II*

Ten parts of water-insoluble copolymer beads of Example I are wet with 100 parts of distilled water, and then 200 parts of standard hydrochloric acid solution are added with shaking. After standing 15 minutes the solution is filtered, and the hydrochloric acid remaining in the filtrate solution is determined by titrating the filtrate with standard sodium hydroxide solution. The efficiency of the resin is determined by calculating the ratio of chloride ions actually removed from the solution to the chloride ions theoretically removable. These calculations show that the resin has a high capacity for removing chloride ions from the hydrochloric acid solution.

*Example III*

The exhausted resin from Example II is regenerated by treating it with approximately ⅓ N sodium hydroxide solution. After filtering off the sodium hydroxide solution and washing the resin well with distilled water, the anion-exchange resin is retested for its ability to adsorb anions according to the method described in Example II and is found capable of regeneration to a considerable portion of its original efficiency.

*Example IV*

Cross-linked copolymer beads are made by substituting 2-vinyl-quinoline for 2-vinyl-pyridine in the procedure described in Example I. By testing the anion-adsorption efficiency and the regeneration efficiency of these copolymer beads according to the procedures of Examples II and III, the 2-vinyl-quinoline cross-linked copolymer is shown to compare favorably with the 2-vinyl-pyridine copolymers.

*Example V*

A mixture of 90 parts 4-vinyl-pyridine, and 10 parts 4-vinyl-cyclohexene is emulsified by the addition of 180 parts by weight of a 10 percent sodium oleate solution. After the addition of 0.2 part ammonium persulfate the emulsion is heated to about 30° C. and agitated for about 20 hours. The copolymer powder product obtained after precipitation, washing and drying shows anion-adsorption and regeneration properties which compare favorably with the copolymer of Example I.

In the preceding examples the 2- and 4-vinyl-pyridines and the 2-vinyl-quinoline may be replaced by other vinyl pyridines and vinyl quinolines, such as mentioned previously, or mixtures comprising any number of these compounds. In the place of cyclopentadiene and 4-vinyl-cyclohexene, other cyclic diene cross-linking agents or mixtures of any number thereof may be used, such as dicyclopentadiene, cyclohexadiene, etc. as listed hereinbefore. Although the above examples show the use of 10 percent cross-linking agent, it will be understood that other proportions of such cross-linking agents can be used for preparing the water-insoluble polymers, e. g., advantageously about 2–25 percent of the cyclic diene cross-linking agents can be used. Minor portions of certain other monomers, such as isobutylene, styrene, chlorostyrene, etc. may be used with the pyridine-type compounds and the cross-linking agents. However, these other monomers should not have functional groups which will interfer with the polymerization activities of the monomers or with the ion-exchange activity of the products, or which may be ruptured to give substantial decrease in length of polymer chains or in cross-linking.

Since the basic pyridine or quinoline groups are the active ion-removing groups in these products, it is advantageous that the major portion of the polymerization mixture be of polymerizable monomers containing the pyridine or quinoline nucleus. Instead of starting with a monomer mixture of the pyridine or quinoline compound and the cross-linking agent, it is also possible to add the cross-linking agent to partial polymers of the pyridine or quinoline compounds and to effect cross-linking by subsequently completing the polymerization.

The cross-linked copolymers suitable for the practice of this invention can be prepared by any method which will give infusible, insoluble resins, for example by mass, solution, emulsion or suspension polymerization. The polymerizations may be advantageously catalyzed by various types of catalysts, such as peroxides, e. g., benzoyl, hydrogen, acetyl, acetyl-benzoyl, phthalyl, lauroyl peroxides, tert.-butylhydroperoxide, etc.; and other per-compounds, e. g., ammonium persulfate, sodium persulfate, sodium perchlorate, etc.

Anions which may be removed from solution by the insoluble polymers of this invention, in addition to the chloride anions mentioned in the examples, include nitrate ions, sulfate ions, acetate ions, oxalate ions, tartrate ions, or any other anions which will react with the basic pyridine or quinoline groups in the resin to form salts. These anion-exchange can be readily regenerated by washing with a dilute alkali solution, preferably of an alkali-metal hydroxide which forms soluble salts with the adsorbed anions.

Inert material, such as diatomaceous earth, Alundum, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

While there are above disclosed but a limited number of embodiments of the invention, it is possible to produce still other embodiments without departing from the inventive concept herein disclosed; and it is, therefore, desired that only such limitations be imposed upon the appended claims as are stated therein or required by the prior art.

What is claimed is:

1. An insoluble, infusible resin comprising the polymerization product of a polymerizable mass comprising (1) 98–75 percent by weight of a polymerizable monomer selected from the class consisting of vinyl pyridines and vinyl quinolines, and (2) 2–25 percent by weight of a copolymerizable vinyl-cyclohexene.

2. A water-insoluble resin of claim 1, in which the vinyl-cyclohexene is 4-vinyl-cyclohexene.

3. A water-insoluble resin of claim 1, in which the polymerizable monomer is a vinyl pyridine.

4. A water-insoluble resin of claim 1, in which the polymerizable monomer is a vinyl quinoline.

5. A water-insoluble resin of claim 1, in which the polymerizable monomer is a vinyl quinoline and the vinyl-cyclohexene is 4-vinyl-cyclohexene.

6. A water-insoluble resin of claim 1, in which the resin is in bead form.

7. A water-insoluble resin of claim 2, in which the resin is in bead form.

8. A water-insoluble resin of claim 3, in which the resin is in bead form.

9. A water-insoluble resin of claim 5, in which the resin is in bead form.

10. An inert carrier coated with a water-insoluble resin of claim 1.

11. In a process for the preparation of a water-insoluble, anion-exchange resin, the step of polymerizing to an infusible, insoluble resin a polymerizable mass comprising (1) 98–75 percent by weight of a polymerizable monomer from the class consisting of vinyl pyridines and vinyl quinolines, and (2) 2–25 percent by weight of a copolymerizable vinyl-cyclohexene.

12. A process step of claim 11, in which the polymerizable monomer is a vinyl pyridine.

13. A process step of claim 11, in which the polymerizable monomer is a vinyl quinoline.

14. A process step of claim 11, in which the vinyl-cyclohexene is 4-vinyl-cyclohexene.

15. The method of treating liquid media to remove anions therefrom which comprises contacting said media with an insoluble, infusible resin prepared from a polymerizable mass comprising (1) 98–75 percent by weight of a polymerizable monomer of the class consisting of vinyl pyridines and vinyl quinolines, and (2) 2–25 percent by weight of a copolymerizable vinyl-cyclohexene.

16. The method of claim 15, in which the vinyl-cyclohexene is 4-vinyl-cyclohexene.

17. The method of claim 15, in which the polymerizable monomer is a vinyl pyridine.

18. The method of claim 15, in which the polymerizable monomer is a vinyl quinoline.

19. The method of claim 17, in which the vinyl-cyclohexene is 4-vinyl-cyclohexene.

20. The method of treating liquid media to remove anions therefrom which comprises contacting said media with an infusible, insoluble copolymer of from 98–75% by weight of 2-vinyl-pyridine and from 2–25% by weight of vinyl-cyclohexene, and separating said copolymer from the liquid media.

21. The method of treating liquid media to remove anions therefrom which comprises contacting said media with an infusible, insoluble copolymer of from 98–75% by weight of 4-vinyl-pyridine and from 2–25% by weight of vinyl-cyclohexene, and separating said copolymer from the liquid media.

22. The method of treating liquid media to remove anions therefrom which comprises contacting said media with an infusible, insoluble copolymer of from 98–75% by weight of 2-vinyl-5-ethyl-pyridine and from 2–25% by weight of vinyl-cyclohexene, and separating said copolymer from the liquid media.

References Cited in the file of this patent

UNITED STATES PATENTS

| Number | Name | Date |
|---|---|---|
| 1,903,500 | Calcott | Apr. 11, 1933 |
| 2,366,008 | D'Alelio | Dec. 26, 1944 |
| 2,402,020 | Cislak | June 11, 1946 |
| 2,481,810 | Barton | Sept. 13, 1949 |
| 2,495,147 | Street | Jan. 17, 1950 |
| 2,521,288 | Evers | Sept. 5, 1950 |
| 2,540,984 | Jackson | Feb. 6, 1951 |
| 2,581,924 | Smith | Jan. 8, 1952 |

FOREIGN PATENTS

| Number | Country | Date |
|---|---|---|
| 849,126 | France | Aug. 7, 1939 |